(12) United States Patent
Muramatsu

(10) Patent No.: US 10,005,415 B2
(45) Date of Patent: Jun. 26, 2018

(54) DETERMINATION APPARATUS AND METHOD FOR OCCUPANT

(71) Applicant: HONDA MOTOR CO., LTD., Tokyo (JP)

(72) Inventor: Yusuke Muramatsu, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 812 days.

(21) Appl. No.: 14/516,877

(22) Filed: Oct. 17, 2014

(65) Prior Publication Data

US 2015/0175111 A1   Jun. 25, 2015

(30) Foreign Application Priority Data

Dec. 19, 2013   (JP) ................................. 2013-262031

(51) Int. Cl.
*B60R 21/015* (2006.01)
*G01G 19/44* (2006.01)
*G01G 19/414* (2006.01)

(52) U.S. Cl.
CPC .. *B60R 21/01516* (2014.10); *B60R 21/01556* (2014.10); *G01G 19/4142* (2013.01)

(58) Field of Classification Search
CPC .......... B60R 21/01516; B60R 21/0152; B60R 21/01556; G01G 19/4142
See application file for complete search history.

(56) References Cited

U.S. PATENT DOCUMENTS

| 2011/0010056 A1* | 1/2011 | Inayoshi | B60N 2/002 701/45 |
| 2012/0312604 A1* | 12/2012 | Fujii | G01G 19/4142 177/1 |
| 2014/0305713 A1* | 10/2014 | Hosokawa | B60R 21/0132 177/136 |

FOREIGN PATENT DOCUMENTS

| JP | 08127264 A | 5/1996 |
| JP | 2001187541 A | 7/2001 |
| JP | 2011016423 A | 1/2011 |
| JP | 2013-001152 A | 1/2013 |

(Continued)

OTHER PUBLICATIONS

Japanese Office Action dated Oct. 20, 2015, issued in counterpart Japanese patent application No. 2013-262031. (4 pages).

*Primary Examiner* — Manuel L Barbee
(74) *Attorney, Agent, or Firm* — Westerman, Hattori, Daniels & Adrian, LLP

(57) ABSTRACT

An occupant determination apparatus includes a weight sensor configured to detect a weight on a seat in a vehicle, a lateral acceleration sensor configured to detect lateral acceleration being acceleration in a width direction of the vehicle and having a positive or negative sign based on the width direction, a processing unit, and a storage unit configured to store a lateral acceleration threshold and a table in which an occupant region for use in the occupant determination is set. The lateral acceleration threshold indicates whether occupant determination for an occupant on the seat is to be conducted and has a positive or negative sign. The table is based on the weight and the lateral acceleration. The processing unit is configured to conduct the occupant determination on the basis of the weight, the lateral acceleration, and the table when the lateral acceleration is higher than the lateral acceleration threshold.

17 Claims, 7 Drawing Sheets

(56) References Cited

FOREIGN PATENT DOCUMENTS

JP        2013001152 A    1/2013

* cited by examiner

DETERMINATION APPARATUS AND METHOD FOR OCCUPANT

CROSS REFERENCES TO RELATED APPLICATIONS

The present application claims priority under 35 U.S.C. § 119 to Japanese Patent Application No. 2013-262031, filed Dec. 19, 2013, entitled "Determination Apparatus and Method for Occupant." The contents of this application are incorporated herein by reference in their entirety.

TECHNICAL FIELD

The present disclosure relates to an occupant determination apparatus and occupant determination method for determining an occupant or occupant type in a vehicle. In particular, it relates to an occupant determination apparatus and occupant determination method for determining an occupant on a seat mounted in a vehicle.

BACKGROUND

A vehicle has air bags to protect a driver and passenger in the vehicle during collisions. Techniques for determining whether an occupant on a seat mounted in a vehicle is an adult or child and appropriately controlling air bags in actuating the air bags are developed.

There is a known occupant detection apparatus for determining an occupant by determining occupant loading using a load sensor disposed on one side of a seat and comparing the occupant loading with a preset threshold to determine whether the occupant on the seat mounted in a vehicle is an adult or child (see Japanese Unexamined Patent Application Publication No. 2013-1152).

That occupant detection apparatus prevents incorrect determination caused by shifting of the weight of the occupant in turning by determining the occupant only when an absolute value of acceleration of the vehicle is equal to or lower than a predetermined value.

However, because the absolute value is used in determining the acceleration of the vehicle, if the vehicle runs in a wide variety of manners, it is difficult to frequently conduct the occupant determination (opportunity is limited).

It is desired that an occupant determination apparatus be able to conduct occupant determination in many cases (increasing opportunities) while ensuring accuracy.

SUMMARY

The present application describes an occupant determination apparatus including a weight sensor configured to detect a weight on a seat in a vehicle and a lateral acceleration sensor configured to detect lateral acceleration being acceleration in a width direction of the vehicle and having a positive or negative sign based on the width direction.

The occupant determination apparatus further includes a storage unit and a processing unit. The storage unit is configured to store a lateral acceleration threshold and a table in which an occupant region for use in the occupant determination is set. The lateral acceleration threshold indicates whether occupant determination for an occupant on the seat is to be conducted and has a positive or negative sign. The table is based on the weight and the lateral acceleration. The processing unit is configured to conduct the occupant determination on the basis of the weight, the lateral acceleration, and the table when the lateral acceleration is higher than the lateral acceleration threshold.

According to one aspect of the present application, the storage unit may be configured to store a result of the occupant determination, and the processing unit may be configured to stop the occupant determination and maintain the stored result of the occupant determination when the lateral acceleration is lower than the lateral acceleration threshold.

According to another aspect of the present application, the occupant region set in the table may be one of at least two occupant regions classified by an occupant determination threshold that increases with an increase in the lateral acceleration.

According to still another aspect of the present application, the weight sensor may be disposed in one of right and left locations of the seat. When the weight sensor is disposed in the left location of the seat, the lateral acceleration may increase to the left. When the weight sensor is disposed in the right location of the seat, the lateral acceleration may increase to the right.

According to yet another aspect of the present application, in the table, the occupant region may be set in a lateral acceleration region having value higher than the lateral acceleration threshold and may not be set in a lateral acceleration region having value lower than the lateral acceleration threshold.

The present application also describes an occupant determination method including the steps of calculating a weight on a seat in a vehicle using a weight sensor, calculating a lateral acceleration using a lateral acceleration sensor, the lateral acceleration being acceleration in a width direction of the vehicle and having a positive or negative sign based on the width direction, and conducting occupant determination for an occupant on the seat on the basis of the weight, the lateral acceleration, and a table based on the weight and the lateral acceleration and in which an occupant region for use in the occupant determination is set.

BRIEF DESCRIPTION OF THE DRAWINGS

The advantages of the disclosure will become apparent in the following description taken in conjunction with the following drawings.

DETAILED DESCRIPTION

An embodiment of the present application is described below with reference to the drawings.

In the following description, a direction in which a vehicle moves forward is a front direction, and a left/right direction is a width direction of the vehicle and is relative to the direction in which the vehicle moves forward.

Figure 1:
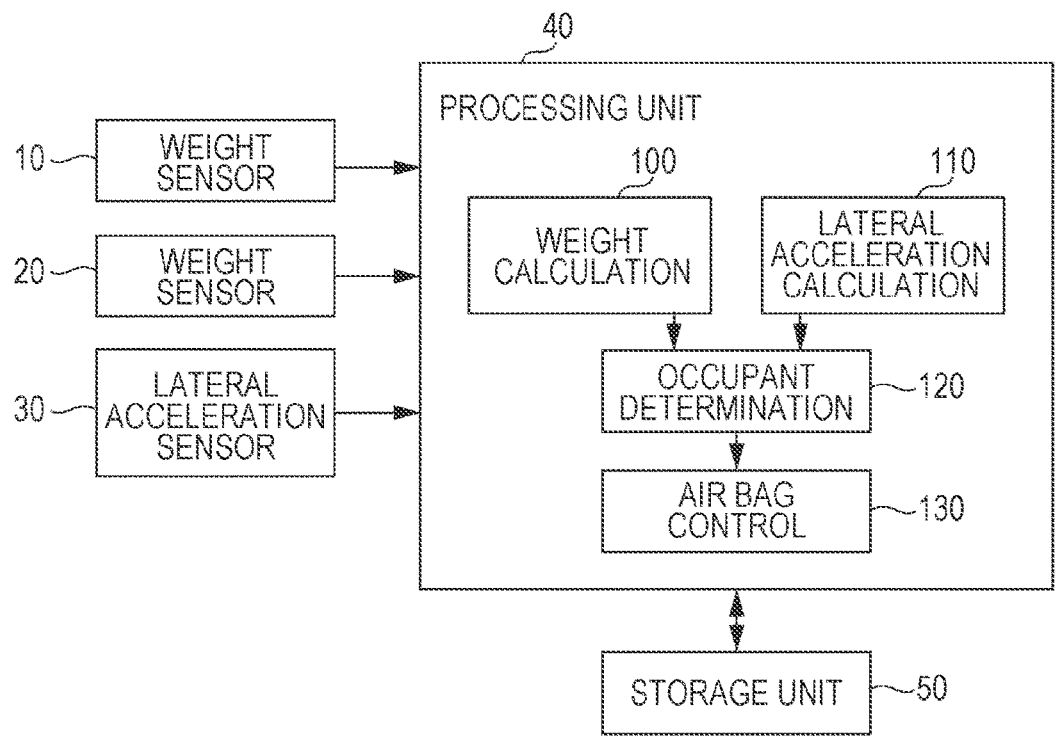
FIG. 1 is a block diagram that illustrates a configuration including an occupant determination apparatus according to an embodiment of the present application.

FIG. 1 is a block diagram that illustrates a configuration including an occupant determination apparatus according to an embodiment of the present application.

The occupant determination apparatus includes a weight sensor 10, a weight sensor 20, a lateral acceleration sensor 30, a processing unit 40, and a storage unit 50.

The weight sensors 10 and 20 detect a weight on a seat mounted in a vehicle.

Figure 2:
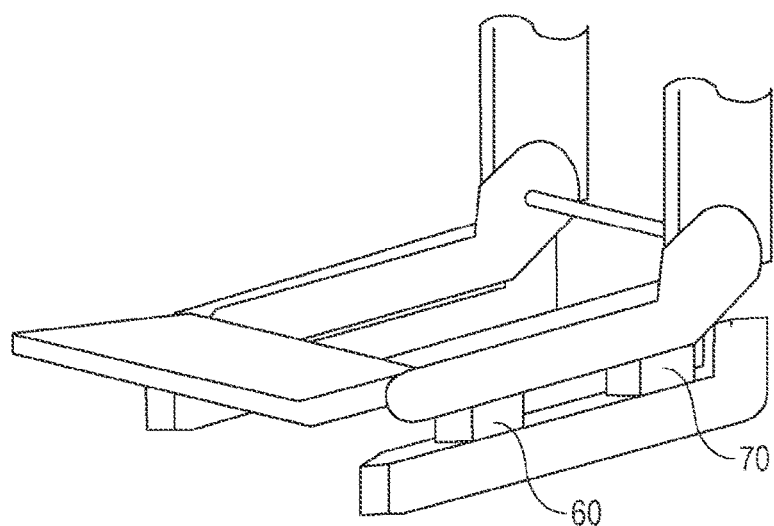
FIG. 2 is a schematic diagram that illustrates locations of weight sensors on a seat.

FIG. 2 is a schematic diagram that illustrates locations of the weight sensors.

The weight sensors 10 and 20 are arranged in two locations of slide adjusting mechanisms 60 and 70 disposed on the left side of the seat. No weight sensors are arranged on the right side of the seat. The weight sensor 10 is arranged on the slide adjusting mechanism 60, which is situated at the front of the seat. The weight sensor 20 is arranged on the slide adjusting mechanism 70, which is situated at the rear of the seat. In comparison with many configurations in related art in which two weight sensors are arranged on each of the right and left sides of the seat, the number of weight sensors is reduced, and this can lead to a simplified configuration.

Each of the weight sensors 10 and 20 receives a load on the seat using a sensor and detects the load, that is, weight using a strain gauge on the lower portion of a flexure element.

The lateral acceleration sensor 30 detects lateral acceleration which is acceleration in the width direction of the vehicle. The lateral acceleration sensor 30 is mounted on a predetermined location fixed on the vehicle on the lower portion of the vehicle, for example, below the seat.

The lateral acceleration has a positive or negative sign based on the width direction of the vehicle. For example, leftward lateral acceleration is a numerical value having a plus sign, and rightward lateral acceleration is a numerical value having a minus sign.

The storage unit 50 can be any non-volatile storage device, including semiconductor memory or hard disc drive (HDD), or a combination of a non-volatile storage device and a volatile storage device. The storage unit 50 stores a table described below, and work data generated or accessed by the processing unit 40 during its operation.

The processing unit 40 is a computer including a processor, such as a central processing unit (CPU), and memory, including a read-only memory (ROM) in which programs are written and a random-access memory (RAM) for use in temporarily storing data. The processing unit 40 includes a weight calculation section 100, a lateral acceleration calculation section 110, an occupant determination section 120, and an air bag control section 130.

Each of the above-described sections included in the processing unit 40 can be achieved by execution of a program by the processing unit 40, which is a computer. That computer program can be stored in any computer-readable storage medium.

Each of the above-described sections included in the processing unit 40 can also be configured as dedicated hardware including one or more electric components, instead of being achieved by execution of the program.

The weight calculation section 100 calculates a weight, that is, load on the seat using information from the two weight sensors 10 and 20.

The lateral acceleration calculation section 110 calculates lateral acceleration using information from the lateral acceleration sensor 30. The lateral acceleration is represented as a numerical value having a positive or negative sign, that is, a plus or minus sign, depending on the left or right direction in which the lateral acceleration acts, as previously described.

The occupant determination section 120 determines an occupant on the seat on the basis of the weight on the seat calculated by the weight calculation section 100, the lateral acceleration calculated by the lateral acceleration calculation section 110, and various kinds of information stored in the storage unit 50. The occupant determination section 120 sends the result of the occupant determination to the air bag control section 130. The occupant determination section 120 determines type of occupant such as adult, child, or absence of an occupant.

The air bag control section 130 controls the air bag mounted in the vehicle on the basis of the result of the occupant determination.

The occupant determination is described next.

First, an example of simple occupant determination in related art is described for comparison.

Figure 3:
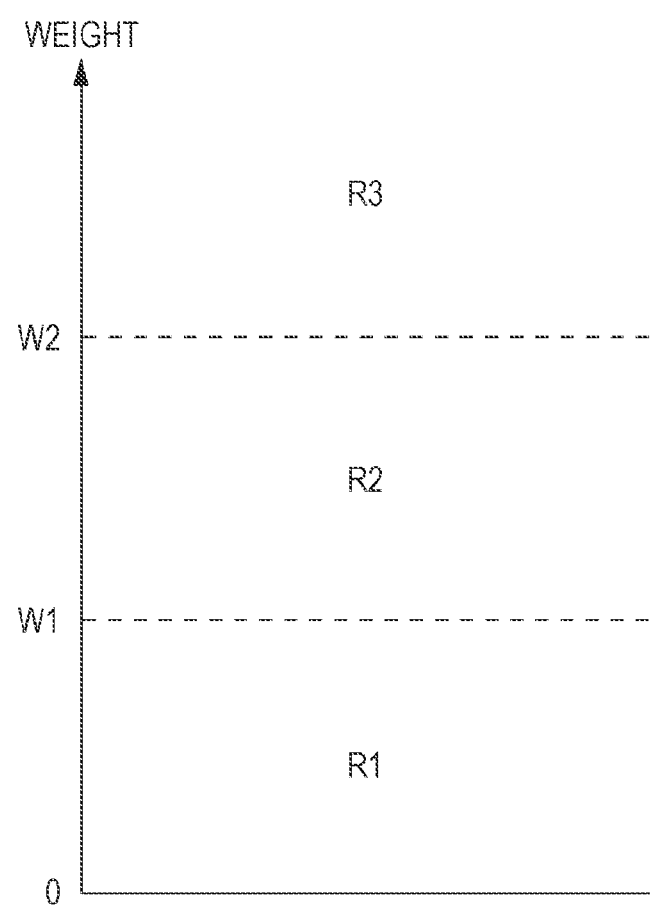
FIG. 3 illustrates a relationship between a weight and occupant determination in related art.

FIG. 3 illustrates a relationship between a weight and occupant determination in related art.

The occupant determination in related art classifies the field into three regions of occupant regions R1, R2, and R3 on the basis of a measured weight.

Occupant determination thresholds W1 and W2 are thresholds for the weight.

The occupant region R1, which is below the occupant determination threshold W1, indicates that the occupant is absent. Hereinafter, this state is also referred to simply as absence.

The occupant region R2, which is between the occupant determination thresholds W1 and W2, indicates that a child safety seat is placed. The child safety seat is also called an auxiliary device for children or child restraint system (CRS). That is, the occupant region R2 indicates a state in which a child rides in the vehicle. Hereinafter, this state is also referred to simply as CRS.

The occupant region R3, which is above the occupant determination threshold W2, indicates a state in which an adult rides in the vehicle. Hereinafter, this state is also referred to simply as adult.

The method of simply determining an occupant in related art determines whether the state is absence, CRS, or adult by comparing the weight calculated over a predetermined period of time with the occupant determination thresholds W1 and W2.

If the vehicle runs and turns along a curve in a road, the vehicle undergoes lateral acceleration. When the vehicle undergoes the lateral acceleration, because the weight sensors 10 and 20 are mounted on the left side of the seat, the weight of the occupant changes from the state in which it is equally allocated between on the side where the weight sensors 10 and 20 are mounted and the side where the weight sensors 10 and 20 are not mounted.

Figure 4:
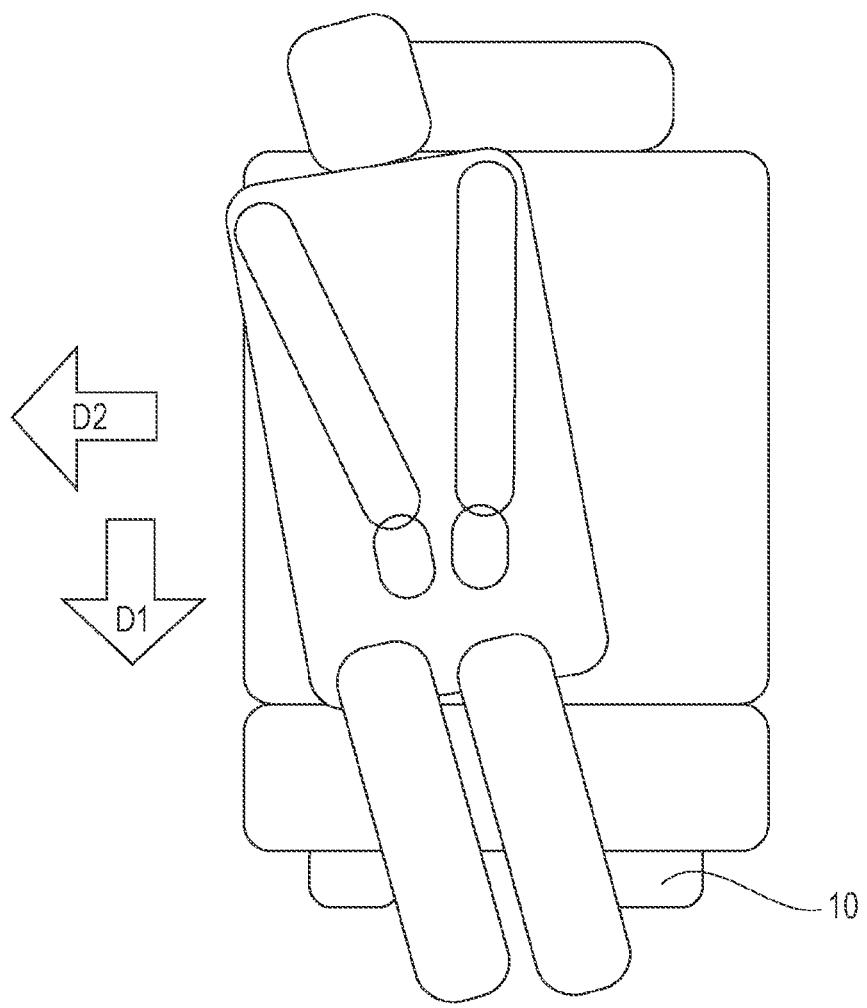
FIG. 4 is a schematic diagram that illustrates a case in which lateral acceleration acts on a side where no weight sensors are mounted.

FIG. 4 is a schematic diagram that illustrates a case in which the lateral acceleration acts on the side where no weight sensors are mounted.

When the vehicle undergoes rightward lateral acceleration, the occupant receives a force in the gravity direction indicated by the arrow D1 and a rightward force caused by the lateral acceleration indicated by the arrow D2. In this case, the weight of the occupant moves to the side where the weight sensors 10 and 20 are not mounted, and the weight sensors 10 and 20 detect a weight lighter than the real one.

Figure 5:
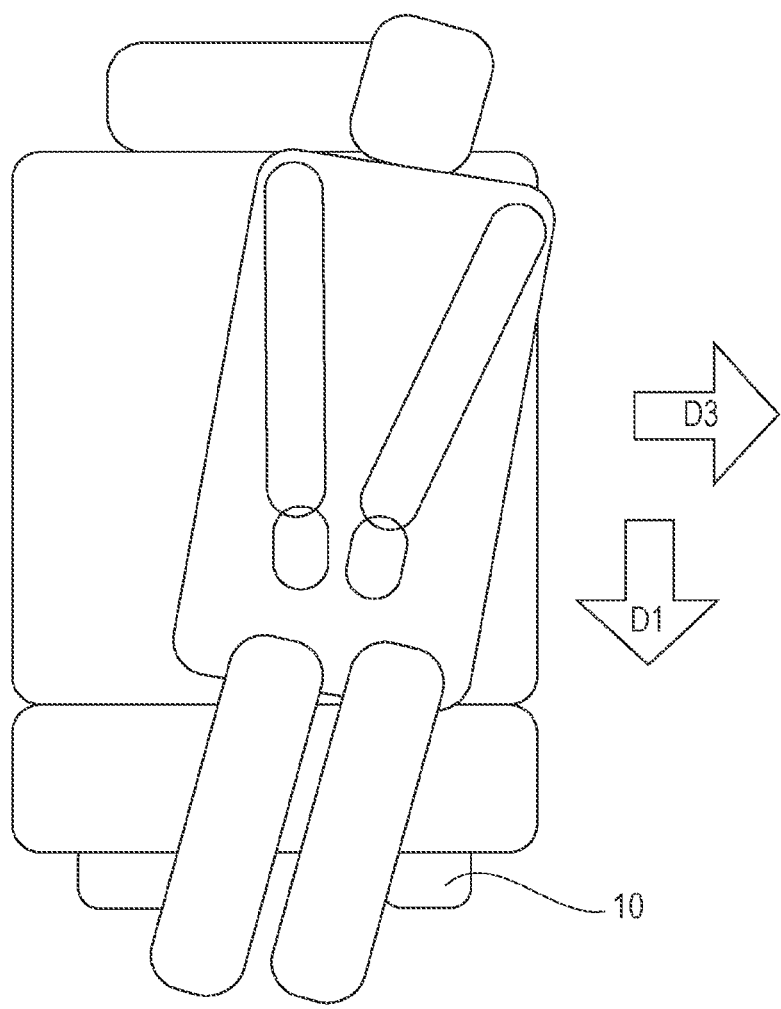
FIG. 5 is a schematic diagram that illustrates a case in which the lateral acceleration acts on a side where the weight sensors are mounted.

FIG. 5 is a schematic diagram that illustrates a case in which the lateral acceleration acts on the side where the weight sensors are mounted.

When the vehicle undergoes leftward lateral acceleration, the occupant receives the force in the gravity direction indicated by the arrow D1 and a leftward force caused by the lateral acceleration indicated by the arrow D3. In this case, the weight of the occupant moves to the side where the weight sensors 10 and 20 are mounted, and the weight sensors 10 and 20 detect a weight heavier than the real one.

Thus, when the vehicle undergoes the lateral acceleration, the occupant determination may be incorrect.

The applicant examined changes in weight and lateral acceleration over time when the vehicle is on a run including a turn in the case where the weight sensors 10 and 20 are disposed on only one side of the seat, as in the present embodiment.

Figure 6:
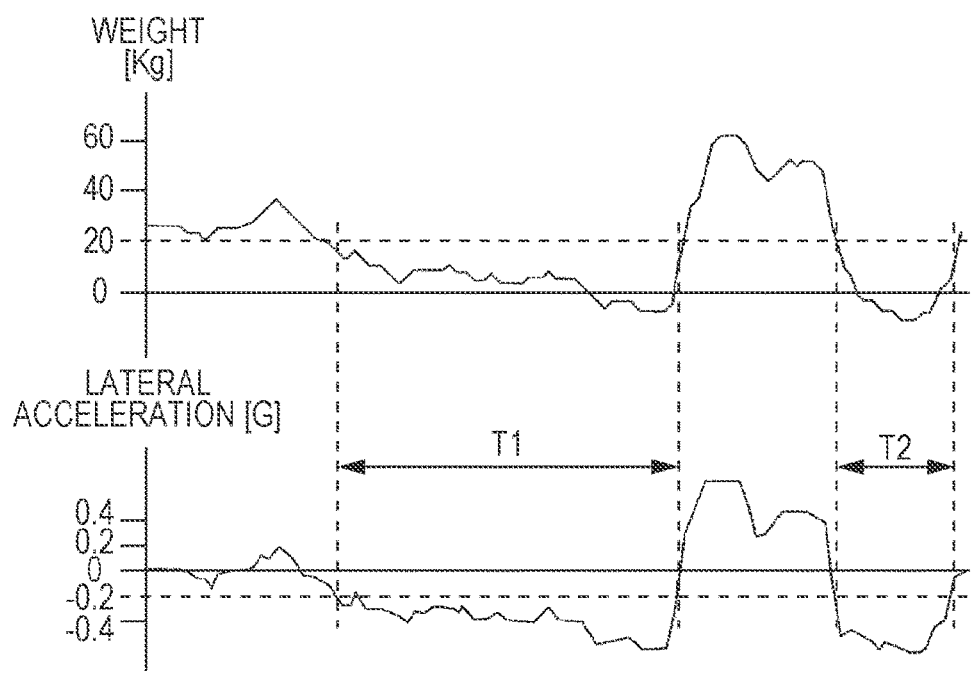
FIG. 6 illustrates an example of correspondence between changes in weight over time and changes in lateral acceleration over time when a vehicle is on a run including a turn.

FIG. 6 illustrates an example of correspondence between changes in weight over time and changes in lateral acceleration over time when the vehicle is on a run including a turn.

FIG. 6 shows that the weight and the lateral acceleration have similar waveforms with respect to an elapsed time. The applicant focused on this phenomenon and drawn a graph of the relationship between the lateral acceleration and the weight.

Figure 7:
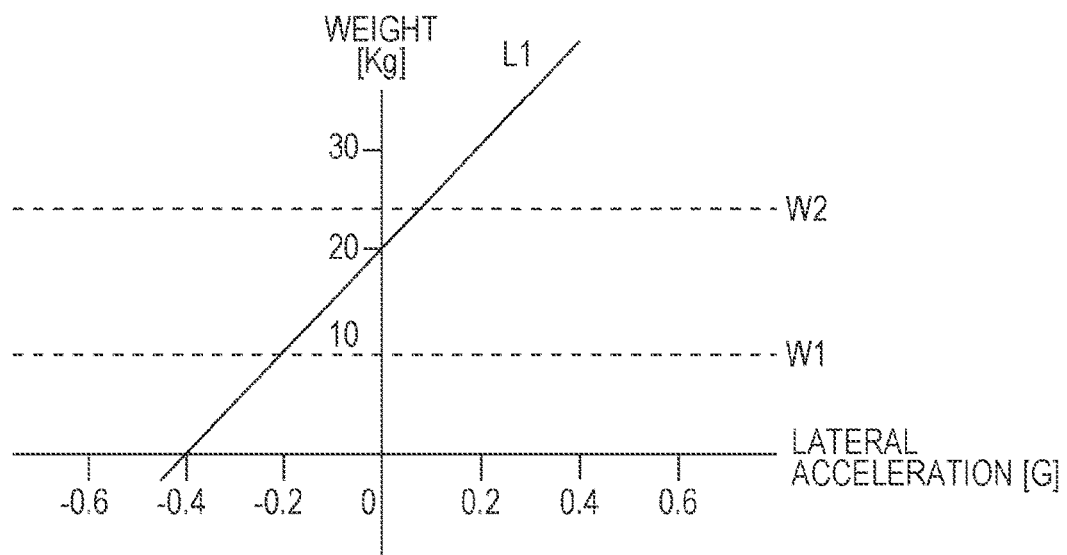
FIG. 7 illustrates a relationship between the lateral acceleration and the weight when a vehicle is on a run including a turn.

FIG. 7 illustrates the relationship between the lateral acceleration and the weight when the vehicle is on a run including a turn.

In FIG. 7, the positive side of the lateral acceleration indicates the state where the vehicle undergoes leftward lateral acceleration. This state is the one in which the occupant moves toward the left side, where the weight sensors 10 and 20 are mounted. The negative side of the lateral acceleration indicates the state where the vehicle undergoes rightward lateral acceleration. This state is the one in which the occupant moves toward the right side, where the weight sensors 10 and 20 are not mounted. FIG. 7 reveals that the relationship between the lateral acceleration and the weight is expressed as like a proportional straight line shape and like a linear function.

Thus, if the lateral acceleration is not considered and the occupant is determined by simply determining the weight using the occupant determination thresholds W1 and W2, the determination is unstable and may be incorrect.

The applicant further measured a relationship between the lateral acceleration and the weight for three kinds of weights of an adult, CRS, and absence when the vehicle is on a run including a turn.

Figure 8:
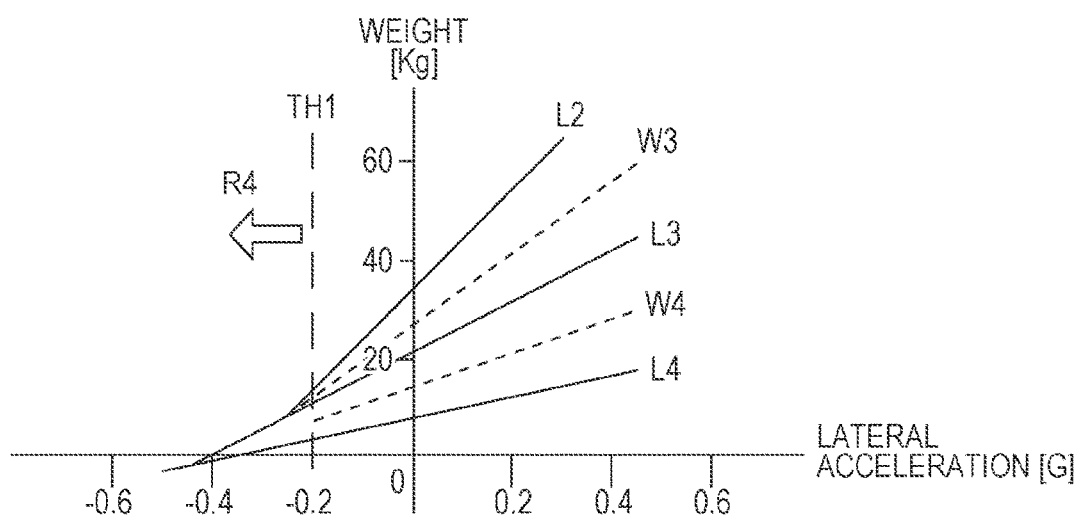
FIG. 8 illustrates a relationship between the lateral acceleration and the weight for three kinds of weights of an adult, CRS, and absence and a lateral acceleration threshold when a vehicle is on a run including a turn.

FIG. 8 illustrates a lateral acceleration threshold and the relationship between the lateral acceleration and the weight for three kinds of weights of an adult, CRS, and absence when the vehicle is on a run including a turn.

FIG. 8 reveals that the relationship between the lateral acceleration and the weight for each of a weight L2 for an adult, a weight L3 for a CRS, a weight L4 for absence, is expressed as like a proportional straight line and like a linear function. Thus, correct occupant determination can be achieved when an occupant determination threshold W3 defining an adult and CRS and an occupant determination threshold W4 defining a CRS and absence are set in a two-dimensional shape that increases with an increase in lateral acceleration as illustrated in the relationship between the lateral acceleration and the weight in FIG. 8.

FIG. 8 further reveals that when the lateral acceleration acts in its positive direction, that is, such that the occupant moves toward the side where the weight sensors 10 and 20 are mounted, the gap between the occupant determination thresholds W3 and W4 is increased, and the accuracy of the occupant determination is enhanced. On the other hand, FIG. 8 also reveals that when the lateral acceleration acts in its negative direction, that is, such that the occupant moves toward the side where the weight sensors 10 and 20 are not mounted, the gap between the occupant determination thresholds W3 and W4 is reduced, the accuracy of the occupant determination is decreased.

When the lateral acceleration is lower value than a lateral acceleration threshold TH1, because the accuracy of the occupant determination is too low to be trusted, the occupant determination should not be conducted in a region R4 in FIG. 8.

In contrast, FIG. 8 reveals that when the lateral acceleration is higher value than the lateral acceleration threshold TH1, the gap between the occupant determination thresholds W3 and W4 is increased, the occupant determination with ensured accuracy can be achieved.

In terms of the weight in FIG. 8, on the side where the weight is reduced by the lateral acceleration, because the difference in weight diminishes to zero, when the lateral acceleration is lower than the lateral acceleration threshold TH1, the occupant determination should not be conducted. On the side where the weight is increased by the lateral acceleration, because the difference in weight is large, the occupant determination with ensured accuracy by setting the occupant determination thresholds W3 and W4 can be achieved.

Figure 9:
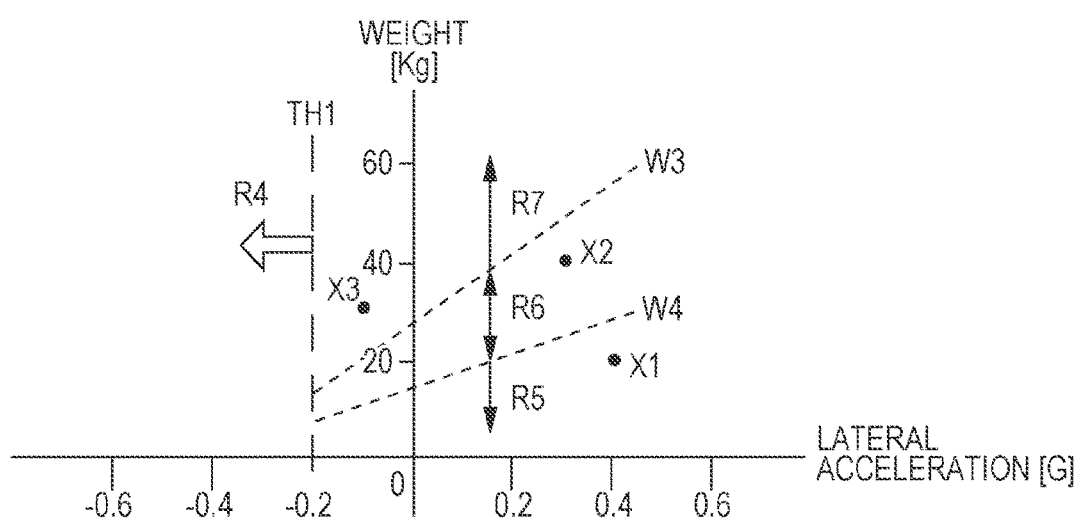
FIG. 9 illustrates occupant determination using a two-dimensional map of the lateral acceleration and the weight.

FIG. 9 illustrates the occupant determination using a two-dimensional map of the lateral acceleration and the weight.

FIG. 9 illustrates the regions divided and classified on the basis of the occupant determination thresholds W3 and W4 in FIG. 8: occupant region R5 indicating absence, occupant region R6 indicating a CRS, and occupant region R7 indicating an adult.

In FIG. 9, the region below the occupant determination threshold W4 is the occupant region R5 indicating absence, the region between the occupant determination thresholds W4 and W3 is the occupant region R6 indicating a CRS, and the region above the occupant determination threshold W3 is the occupant region R7 indicting an adult.

In the present embodiment, a map composed of the lateral acceleration and the weight and in which the occupant region R5 indicating absence, the occupant region R6 indicating a CRS, and the occupant region R7 indicting an adult for use in determining an occupant on a seat are set, as illustrated in FIG. 9, is stored in the form of a table in the storage unit 50.

The table illustrated in FIG. 9 is configured to output the occupant region R5, R6, or R7, which indicates a corresponding result of occupant determination, in response to input weight and lateral acceleration.

The occupant regions R5, R6, and R7 can be described as being set in a two-dimensional map because they change in accordance with the lateral acceleration.

The area of each of the occupant regions R5, R6, and R7 increases in the positive direction of the lateral acceleration. Each of the occupant determination thresholds W3 and W4 for defining the occupant regions R5, R6, and R7 increases in the positive direction of the lateral acceleration and is expressed as like a linear function with respect to the lateral acceleration.

Each of the occupant determination thresholds W3 and W4 is not set in the region R4, where the lateral acceleration is lower than the lateral acceleration threshold TH1, and it can be removed from the table. This can reduce the area required for the table in the storage unit 50 and can enable the storage unit 50 to have a smaller storage area to be used.

The storage unit 50 further stores the lateral acceleration threshold TH1. The lateral acceleration threshold TH1 may be stored separately from the table or may be substantially stored by inputting information indicating that occupant determination is impossible into the region R4 in the table.

Examples are described below. When a measure value X1 in which the weight is 20 kg and the lateral acceleration is +0.4 G (hereinafter the sign "+" in positive numerical values of the lateral acceleration is omitted) is input into the table illustrated in FIG. 9, the result of being in the occupant region R5 is output.

When a measure value X2 in which the weight is 40 kg and the lateral acceleration is 0.3 G is input into the table illustrated in FIG. 9, the result of being in the occupant region R6 is output.

When a measure value X3 in which the weight is 30 kg and the lateral acceleration is −0.1 G is input into the table illustrated in FIG. 9, the result of being in the occupant region R7 is output.

The process in the occupant determination section 120 is described below.

Figure 10:
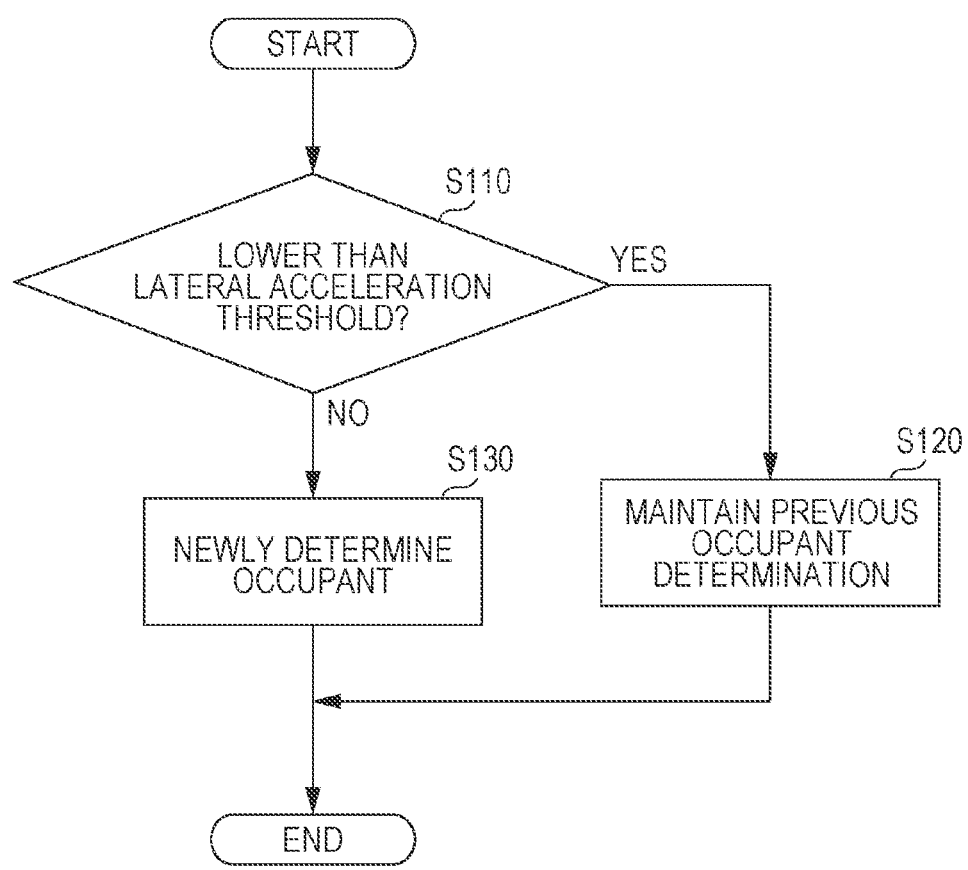
FIG. 10 is a flowchart that illustrates a procedure of operations in a process in an occupant determination section.

FIG. 10 is a flowchart that illustrates a procedure of operations in the process in the occupant determination section.

At step S110, the occupant determination section 120 reads the lateral acceleration threshold TH1 from the storage unit 50 and compares the lateral acceleration calculated by the lateral acceleration calculation section 110 with the lateral acceleration threshold TH1.

Here, each of the lateral acceleration and the lateral acceleration threshold TH1 is a numerical value having a positive or negative sign. It is to be noted in the description below that when each of the lateral acceleration and the lateral acceleration threshold TH1 is a numerical value having a negative sign, the value becomes smaller or lower as its absolute value, which is obtained by removing the negative sign, increases. In FIGS. 7, 8, and 9, the lateral acceleration becomes smaller or lower to the negative side of the lateral acceleration expressed on the horizontal axis.

When the lateral acceleration is lower than the lateral acceleration threshold TH1, the process proceeds to step S120. When the lateral acceleration is not lower than the lateral acceleration threshold TH1, the process proceeds to step S130.

At step S120, the occupant determination section 120 does not newly conduct the occupant determination. That is, the occupant determination section 120 stops the occupant determination. The occupant determination section 120 maintains the result of the previous occupant determination stored in the storage unit 50.

Thus the occupant determination section 120 outputs the same result as the previous occupant determination to the air bag control section 130. After that, the occupant determination process is completed.

An example using the time course illustrated in FIG. 6 is described below. In this example, the lateral acceleration threshold TH1 is −0.2 G, and no occupant determination is conducted in periods T1 and T2, where the lateral acceleration is lower than −0.2 G. In those periods, the result of the previous occupant determination is maintained. This can prevent incorrect occupant determination.

At step S130, the occupant determination section 120 starts new occupant determination.

The occupant determination section 120 conducts the occupant determination by referring to the table stored in the storage unit 50 using the weight calculated by the weight calculation section 100 and the lateral acceleration calculated by the lateral acceleration calculation section 110 as parameters and reading the occupant region R5, R6, or R7.

For example, in the case of the measured value X1 illustrated in FIG. 9, in which the weight is 20 kg and the lateral acceleration is 0.4 G, the occupant determination section 120 reads the occupant region R5 from the table and determines that the occupant is absent.

In the case of the measured value X2 illustrated in FIG. 9, in which the weight is 40 kg and the lateral acceleration is 0.3 G, the occupant determination section 120 reads the occupant region R6 from the table and determines that a CRS is on the seat.

In the case of the measured value X3 illustrated in FIG. 9, in which the weight is 30 kg and the lateral acceleration is −0.1 G, the occupant determination section 120 reads the occupant region R7 from the table and determines that the occupant is an adult.

The occupant determination section 120 stores the result of this occupant determination in the storage unit 50 and completes the process.

If information indicating that occupant determination is impossible is stored in the region R4 in the table, the occupant determination section 120 performs the process described below.

At step S110, the occupant determination section 120 refers to the table stored in the storage unit 50 using the weight and the lateral acceleration as parameters and reads the occupant region R4, R5, R6, or R7.

When the occupant region R4 is read, the determination is that the lateral acceleration is lower than the lateral acceleration threshold TH1, and the process proceeds to step S120.

When a region other than the occupant region R4 is read, the process proceeds to step S130.

The process after step S120 is the same as that previously described.

As described above, the occupant determination section 120 maintains the result of the previous occupant determination if the calculated lateral acceleration is lower than the predetermined lateral acceleration threshold TH1, which is set as not an absolute value but a value that considers a positive or negative sign. After that, when the calculated lateral acceleration is higher than the set predetermined lateral acceleration threshold TH1, the occupant determination restarts.

A comparison between the present embodiment and a case where absolute values, which have no positive or negative sign, are used as the lateral acceleration and the threshold and no occupant determination is conducted when the lateral acceleration exceeds the threshold is described below. In the present embodiment, when the lateral acceleration acts on the side where the weight sensors 10 and 20 are disposed, the occupant determination is enabled, and the immediacy is improved. Even for the lateral acceleration acting on the side where the weight sensors 10 and 20 are disposed, because the gap between the occupant determination thresholds W3 and W4 is wide, the accuracy is not low.

In the embodiment described above, the case where the weight sensors are mounted on the left side of the seat is discussed. In a case where they are mounted on the right side of the seat, the left and right relationship is just opposite. That is, if the weight sensors are mounted on the right side, the lateral acceleration is detected or calculated such that it increases in the right direction.

Accordingly, the present embodiment is also applicable to the case where the weight sensors are mounted on the opposite right side of the seat.

As described above, the occupant determination apparatus according to the present embodiment includes the weight sensors 10 and 20 configured to detect the weight on the seat in the vehicle, the lateral acceleration sensor 30 configured to detect the lateral acceleration being acceleration in the width direction of the vehicle and having a positive or negative sign based on the width direction, the storage unit 50 configured to store the lateral acceleration threshold TH1 indicating whether the occupant determination for the occupant on the seat is to be conducted and having a positive or negative sign and the table based on the weight and the lateral acceleration and in which the occupant region for use in the occupant determination is set, and the processing unit 40 configured to conduct the occupant determination on the basis of the weight, the lateral acceleration, and the table when the lateral acceleration is higher than the lateral acceleration threshold TH1.

In the present embodiment, the lateral acceleration that is not an absolute value but a numerical value having a positive or negative sign expressing the left or right direction is compared with the lateral acceleration threshold TH1 having a positive or negative sign as well.

Even if the absolute value of the lateral acceleration is large, when it is more positive, that is, higher than the lateral acceleration threshold TH1, a correct occupant determination result is obtainable.

The occupant determination apparatus according to the present embodiment stops the occupant determination without updating and maintains the stored (previously performed) occupant determination result when the lateral acceleration is more negative, that is, lower than the lateral acceleration threshold TH1.

The present embodiment can prevent incorrect occupant determination in the zone where the gap between the occupant regions for absence, a CRS, and an adult is small.

Embodiments are not limited to the above-described embodiment. Various changes can be made without departing from the scope of the technique. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

What is claimed is:

1. A determination apparatus for occupant comprising:
   a weight sensor configured to detect a weight of an object on a seat in a vehicle;
   a lateral acceleration sensor configured to detect lateral acceleration, the lateral acceleration being acceleration in a width direction of the vehicle and having a positive or negative sign based on the width direction;
   a storage unit configured to store:
     a lateral acceleration threshold, the lateral acceleration threshold indicating whether occupant determination for an occupant on the seat is to be conducted and having a positive or negative sign, and
     a table in which an occupant region for use in the occupant determination is set, the table being made based on the weight and the lateral acceleration; and
   a processing unit configured to conduct the occupant determination on the basis of the weight, the lateral acceleration, and the table when the lateral acceleration is higher than the lateral acceleration threshold,
   wherein the weight sensor is disposed at one width wise direction side of the seat such that the weight detected by the weight sensor increases when the lateral acceleration is exerted in the one width wise direction and the weight detected by the weight sensor decreases when the lateral acceleration is exerted in an opposite direction opposite to the one width wise direction, and
   the processing unit determines whether the lateral acceleration is higher than the lateral acceleration threshold, and when the lateral acceleration is not higher than the lateral acceleration threshold, the processing unit does not conduct the occupant determination.

2. The determination apparatus for occupant according to claim 1, wherein the storage unit is configured to store a result of the occupant determination, and
   the processing unit is configured to stop the occupant determination and maintain the stored result of the occupant determination when the lateral acceleration is lower than the lateral acceleration threshold.

3. The determination apparatus for occupant according to claim 1, wherein the occupant region set in the table is one of at least two occupant regions classified by an occupant determination threshold that increases with an increase in the lateral acceleration.

4. The determination apparatus for occupant according to claim 1, wherein the weight sensor is disposed in one of right and left locations of the seat,
   when the weight sensor is disposed in the left location of the seat, the lateral acceleration increases to the left, and
   when the weight sensor is disposed in the right location of the seat, the lateral acceleration increases to the right.

5. The determination apparatus for occupant according to claim 1, wherein in the table, the occupant region is set in a lateral acceleration region higher than the lateral acceleration threshold and is not set in a lateral acceleration region lower than the lateral acceleration threshold.

6. The determination apparatus for occupant according to claim 1, wherein the table is a two-dimensional map composed of the weight and the lateral acceleration as coordinate axes, and the occupant region is a region on the two-dimensional map.

7. The determination apparatus for occupant according to claim 6, wherein occupant region is divided into a plurality of classified regions by an occupant determination threshold line for weight that increases with an increase in the lateral acceleration.

8. The determination apparatus for occupant according to claim 7, wherein the processing unit performs the occupant determination by referring to the table with using the weight and the lateral acceleration to find a corresponding classified region among the plurality of the classified regions.

9. The determination apparatus for occupant according to claim 1, wherein the lateral acceleration has the positive sign in one width direction of the vehicle and has the negative sign in an opposite width direction of the vehicle.

10. The determination apparatus for occupant according to claim 1, wherein the processing unit determines whether the lateral acceleration is higher than the lateral acceleration threshold.

11. The determination apparatus for occupant according to claim 1, wherein the occupant determination determines a type of the occupant.

12. A vehicle comprising the determination apparatus for occupant according to claim 1.

13. The determination apparatus for occupant according to claim 1, wherein the lateral acceleration takes a negative value when the lateral acceleration is exerted in the opposite direction opposite to the one width wise direction, and
   wherein the lateral acceleration threshold is a negative value.

14. A determination method for occupant comprising the steps of:
   calculating a weight of an object on a seat in a vehicle using a weight sensor;
   calculating a lateral acceleration using a lateral acceleration sensor, the lateral acceleration being acceleration in a width direction of the vehicle and having a positive or negative sign based on the width direction;
   determining, by using a computer, whether the lateral acceleration is higher than a lateral acceleration threshold, the lateral acceleration threshold having a positive or negative sign and indicating whether occupant determination for an occupant on the seat is to be conducted; and
   when the lateral acceleration is higher than the lateral acceleration threshold, conducting, by using the computer, the occupant determination on the basis of the weight, the lateral acceleration, and a table made based on the weight and the lateral acceleration and in which an occupant region for use in the occupant determination is set,
   wherein the weight sensor is disposed at one width wise direction side of the seat such that the weight detected by the weight sensor increases when the lateral acceleration is exerted in the one width wise direction and the weight detected by the weight sensor decreases when the lateral acceleration is exerted in an opposite direction opposite to the one width wise direction, and
   the method further comprising, when the lateral acceleration is not higher than the lateral acceleration threshold, not conducting the occupant determination by using the computer.

15. The determination method for occupant according to claim 14, wherein the lateral acceleration takes a negative value when the lateral acceleration is exerted in the opposite direction opposite to the one width wise direction, and
   wherein the lateral acceleration threshold is a negative value.

16. A determination apparatus for occupant comprising:
   a weight sensor configured to detect a weight of an object on a seat in a vehicle;
   a lateral acceleration sensor configured to detect lateral acceleration, the lateral acceleration being acceleration in a width direction of the vehicle and having a positive or negative sign based on the width direction;
   a storage device configured to store:
      a lateral acceleration threshold, the lateral acceleration threshold indicating whether occupant determination for an occupant on the seat is to be conducted and having a positive or negative sign, and
      a table in which an occupant region for use in the occupant determination is set, the table being made based on the weight and the lateral acceleration; and
   a controller configured to conduct the occupant determination on the basis of the weight, the lateral acceleration, and the table when the lateral acceleration is higher than the lateral acceleration threshold,
   wherein the weight sensor is disposed at one width wise direction side of the seat such that the weight detected by the weight sensor increases when the lateral acceleration is exerted in the one width wise direction and the weight detected by the weight sensor decreases when the lateral acceleration is exerted in an opposite direction opposite to the one width wise direction, and
   the controller determines whether the lateral acceleration is higher than the lateral acceleration threshold, and when the lateral acceleration is not higher than the lateral acceleration threshold, the controller does not conduct the occupant determination.

17. The determination apparatus for occupant according to claim 16, wherein the lateral acceleration takes a negative value when the lateral acceleration is exerted in the opposite direction opposite to the one width wise direction, and
   wherein the lateral acceleration threshold is a negative value.

* * * * *